United States Patent [19]

Genske et al.

[11] Patent Number: 5,407,751
[45] Date of Patent: Apr. 18, 1995

[54] EASY PEEL FILM STRUCTURE ESPECIALLY FOR RETORTABLE LIDSTOCK

[75] Inventors: Roger P. Genske, Neenah, Wis.; Roy A. Bubel, Oak Lawn, Ill.

[73] Assignee: American National Can Company, Chicago, Ill.

[21] Appl. No.: 861,706

[22] Filed: Apr. 1, 1992

Related U.S. Application Data

[60] Continuation-in-part of Ser. No. 595,650, Oct. 4, 1990, abandoned, and Ser. No. 402,747, Sep. 5, 1989, Pat. No. 5,137,763, which is a continuation of Ser. No. 138,222, Dec. 23, 1987, Pat. No. 4,894,266, which is a continuation-in-part of Ser. No. 81,789, Aug. 5, 1987, abandoned, Ser. No. 802,910, Nov. 29, 1985, Pat. No. 4,764,404, and Ser. No. 45,003, Apr. 30, 1987, Pat. No. 4,937,139, said Ser. No. 595,650, is a continuation of Ser. No. 206,078, Jun. 13, 1988, abandoned, which is a division of Ser. No. 45,003, Jun. 13, 1988.

[51] Int. Cl.$^6$ ......................... B32B 27/32; B32B 27/28
[52] U.S. Cl. .................... 428/516; 428/35.7; 428/36.8; 525/240
[58] Field of Search ................ 428/516, 35.7, 36.8

[56] References Cited

U.S. PATENT DOCUMENTS

| | | |
|---|---|---|
| 3,879,492 | 4/1975 | Bontinick . |
| 4,280,653 | 7/1981 | Elias . |
| 4,398,644 | 8/1983 | Claude et al. . |
| 4,588,621 | 5/1986 | Bunel et al. . |
| 4,638,913 | 1/1987 | Howe, Jr. . |
| 4,881,649 | 11/1989 | Hsu et al. . |
| 4,894,266 | 1/1990 | Bauer et al. . |
| 4,966,795 | 10/1990 | Genske et al. . |
| 4,994,324 | 2/1991 | Bose et al. ............... 428/516 |
| 5,002,811 | 3/1991 | Bauer et al. . |
| 5,006,384 | 4/1991 | Genske . |
| 5,011,719 | 4/1991 | Gehske et al. ............ 428/35.7 |
| 5,023,121 | 6/1991 | Pockat et al. . |
| 5,061,532 | 10/1991 | Yamada . |
| 5,069,355 | 12/1991 | Matuszak . |
| 5,071,686 | 10/1991 | Genske et al. ............ 428/35.7 |
| 5,092,469 | 3/1992 | Takata et al. . |
| 5,093,164 | 3/1992 | Bauer et al. . |
| 5,110,642 | 5/1992 | Genske ............... 428/35.8 |
| 5,160,767 | 11/1992 | Genske ............... 428/35.98 |

*Primary Examiner*—Carman J. Seccuro, Jr.
*Attorney, Agent, or Firm*—Mary J. Schnurr

[57] ABSTRACT

Multi-layer films having an outer sealant layer which readily delaminates from the adjacent sealant layer are disclosed. For retort applications, preferably one of the outer or adjacent sealant layers is comprised of a majority of ethylene moieties and the other of the outer or adjacent sealant layers is comprised of a majority of propylene moieties. The film is especially well-suited for use as a lidstock sealed to a container, such as a tray.

12 Claims, 2 Drawing Sheets

EASY PEEL FILM STRUCTURE ESPECIALLY FOR RETORTABLE LIDSTOCK

This application is a continuation-in-part of application Ser. No. 595,650, filed Oct. 4, 1990, now abandoned, which is a continuation of Ser. No. 206,078, filed Jun. 13, 1988, now abandoned, which was a divisional of Ser. No. 045,003, filed Apr. 30, 1987, now U.S. Pat. No. 4,937,139; this application is also a continuation-in-part of application Ser. No. 402,747, filed Sep. 5, 1989, now U.S. Pat. No. 5,137,713, which was a continuation of Ser. No. 138,222 filed Dec. 23, 1987, now U.S. Pat. No. 4,894,266, which was a continuation-in-part of Ser. No. 081,789, filed Aug. 5, 1987, now abandoned, Ser. No. 802,910, filed Nov. 29, 1985, now U.S. Pat. No. 4,764,404, and Ser. No. 045,003, filed Apr. 30, 1987, now U.S. Pat. No. 4,937,139; all of which are herein incorporated by reference.

This invention relates to an easy peel sealant material for a film structure, which is especially suitable for use as a lidstock for a container. This invention further relates to a multi-layer film laminate used as a lidstock for a container, whereupon opening the container the lidstock is pulled away from the container cleanly, except that the laminate preferentially delaminates at the laminate/container sealing interface to leave the first layer of the laminate adhered to the container. This invention also relates to a multi-layer structure where the layer immediately adjacent to the sealant layer adheres to the sealant layer only well enough to maintain the structure but delaminates at a preferential interface upon the application of a prescribed force. The film laminate may be a lidstock sealed to a retortable container and the lidstock can be peeled open when the package is cold. Alternately, the film laminate can be sealed to another film to form a pouch and the laminate of this invention can be peeled open when the pouch is cold.

BACKGROUND OF THE INVENTION

While a number of film structures can be sealed to a container to form a package, the majority of these structures do not open by the delamination mechanism of this invention.

In the prior art, many of the film structures available peeled by a cohesive split of one of the sealant layers of the lidstock laminates. Prior art sealant layers included a monolayer sealant, such as of a 2.0 mil thickness of a polypropylene/polyethylene (PP/PE) blend. Prior art lidstock laminates also include a multi-layer sealant wherein one of the sealant layers cohesively splits during the opening of the lidstock.

One of the main problems with these prior art film laminates is that they are difficult to remove from the container. It is desirable that the opening of the package not occur between the outer layer of the lidstock sealant layer and the tray. This opening mechanism would lend itself too readily to package failures during handling and processing, especially during the demanding processing of retort applications.

It is preferred that the opening mechanism of a film structure/container package be failure within the film structure layers. This insures the hermetic seal of the film structure/container assembly. However, the cohesive split opening mechanism of the prior art requires a relatively large force to open or peel such lidstocks because it requires the physical splitting of one of the layers.

Consumers find the relatively large force requirements for opening such packages to be undesirable. This problem is more severe for consumers who prefer to remove the lidstock from the container while the package is cold. A cold peel of the lidstock requires an even greater amount of physical strength than a hot peel. Most of the available lidstocks must be peeled while the container is hot, such as after the tray/lidstock package is placed in the microwave oven, because of the great difficulty of removing these lidstocks when they are cold.

It is desirable to provide a multi-layer structure for which the opening mechanism is an adhesive failure between two predetermined layers. This allows for a more controllable and consistent peeling force.

One known multi-layer structure which delaminates between two specific layers is a lidstock for a polypropylene tray. The sealant layers are polypropylene adjacent the tray, with an ethylene acrylic acid copolymer blended with ethylene methacrylate copolymer (EAA/EMA layer) in the adjacent layer. The remaining layers of the multi-layer laminate are adhered to the EAA/EMA blend layer. When the lidstock is removed from the tray, the lidstock breaks at the interface between the polypropylene layer and the EAA/EMA layer. However, this lidstock is not approved by the FDA for retort applications.

It is believed that the delamination structure of this invention and packages made therefrom, especially multi-layer laminates sealed to containers, and capable of withstanding retort applications have not been disclosed or suggested in the prior art. Retortable packages, such as a multi-layer laminate or lidstock sealed to a thermoformed tray, contain food and must be retorted if they are to be shelf stable, i.e., having a shelf life of at least six months without refrigeration. The retort process subjects the sealed package to a temperature of 212° F. to 275° F. for 20 to 60 minutes or perhaps even longer, up to 100 minutes, depending on the size of the container. During the retort process, gases are generated within the package and pressure increases greatly. Although the retort system may include an over pressure to help balance the package internal pressures, the net result will still be a pressurized package during retorting.

Thus, the multi-layer laminates and also the seals to the container must be sufficiently strong to withstand the increased internal pressure and the elevated temperatures. These retortable packages often require a relatively large force to open the packages after microwave heating, in part because the forces generated in the interior of the package during retorting require a strong seal. The required force is even greater if it is desired to open the package, particularly a retortable package, while it is cold.

There is a great need for a multi-layer laminate which can be sealed to a container to make a package which does not open during the retort process and can be peeled opened both before and after cooking, by average manual force. It is an object of this invention to meet this need.

SUMMARY OF THE INVENTION

It has been discovered that a multi-layer structure including a first outer sealant layer, and a second adjacent sealant layer in face-to-face contact with the first layer, and a third layer in face-to-face contact with the second layer, where the first layer is comprised of greater than 50% ethylene or propylene moieties, and the second layer is of greater than 50% of one of propylene or ethylene moities, whichever is not in predominance in the first layer, wherein the film will delaminate between the first layer and the second layer upon a force being exerted to separate the layers of the film. The film is particularly adaptable to being retorted and is also capable of being peelably opened both before and after cooking. The present invention accordingly provides such multi-layer structures and packages.

A first structure for the multi-layer structure is comprised of a first layer, a second layer, and a third layer, where the first layer is comprised of greater than 50% propylene moieties, the second layer is comprised of greater than 50% ethylene moieties and is in face-to-face contact with the first layer, and a third layer in face-to-face contact with one of the first layer or the second layer.

A second structure for the multi-layer structure is comprised of a first layer, a second layer in face-to-face contact with the first layer, a third layer in face-to-face contact with the second layer, and a fourth layer in face-to-face contact with the third layer, where the first layer is of greater than 50% of one of propylene or ethylene moieties, the second layer is of greater than 50% of one of propylene or ethylene moieties, whichever is not in predominance in the first layer, the third layer is an adhesive, and the fourth layer is a polyester.

Another structure provided by the present invention includes a first layer comprising greater than 50%–100% propylene moieties, 0–38% of an elastomer, such as polyisobutylene, and 0–20% of a plasticizer, such as an ethylene α-olefin copolymer.

Figure 6:
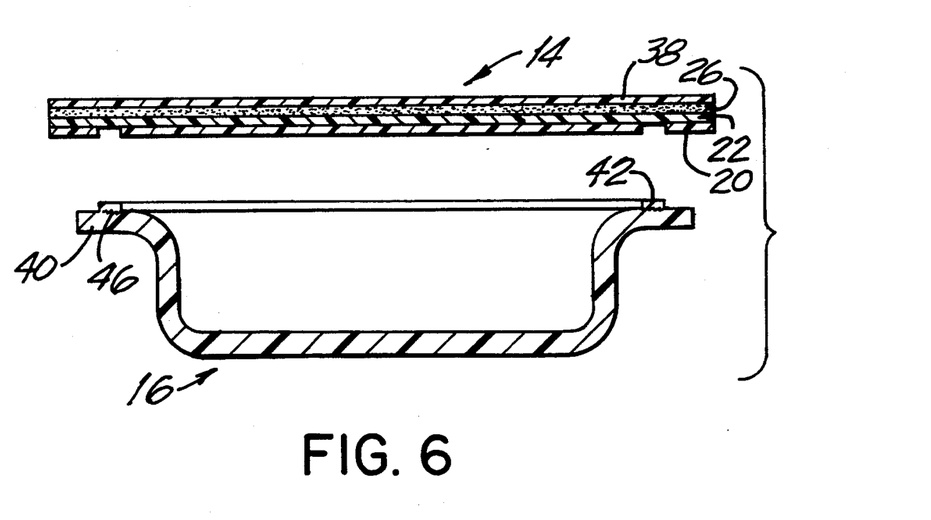

The film structures of the present invention are adapted to be heat sealed either to a base film or to a container. The container and/or the base film should have a sealant layer with a composition having a majority of propylene or ethylene moieties to match the predominate composition in the first outer sealant layer of the film structure that is the subject of this invention. The film structures are retortable and also are openable by a delamination/breaking effect of the film structure of this invention. The manual peeling force required is preferably controlled by adjusting the compositions of the outer sealant layer and the adjacent sealant layers. As the force is exerted to remove the film from the container or pouch, the outer sealant layer delaminates from the adjacent sealant layer in the area of the sealing interface. The outer sealant layer breaks on each side of the sealing interface to completely open the package as shown in FIG. 6.

For retort applications, the container or base film are often polypropylene or polyethylene based. The outer sealant layer should include a predominance of polyethylene or polypropylene to match the predominance in the container or base film. The adjacent sealant layer may comprise any of a number of compositions which adhere only to a limited extent to the composition of the outer sealant layer. If the outer sealant layer is predominately polypropylene, the adjacent sealant layer may include polyethylene or ethylene copolymers which have a limited affinity to propylene. If the outer sealant is predominately polyethylene, the adjacent sealant layer may include polypropylene or propylene copolymers.

By selecting the compositions of the outer sealant layer and adjacent sealant layer to have limited affinity to one another, the film structure will delaminate under the exertion of a predetermined amount of force. This allows for a cold removal of the film structure from the container or base film.

DETAILED DESCRIPTION

Figure 1:
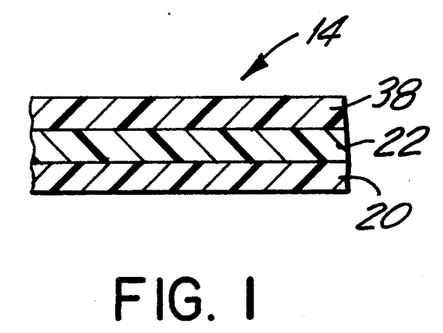
FIG. 1 shows a three layer structure that is the subject of the present invention.

FIG. 1 shows a multi-layer film 14 which comprises outer sealant layer 20, adjacent sealant layer 22 and polymer layer 38. The compositions of outer sealant layer 20 and adjacent sealant layer 22 are as discussed in detail with regard to the structure of FIG. 3. Polymer layer 38 may be any suitable layer that adheres to adjacent sealant layer 22.

Figure 2:
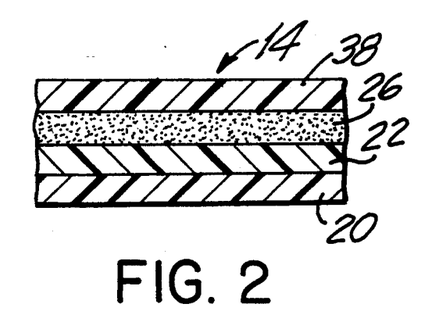
FIG. 2 shows a four layer structure that is the subject of the present invention.

In FIG. 2, multi-layer film 14 comprises outer sealant layer 20, adjacent sealant layer 22, adhesive layer 26 and polymer layer 38. Possible compositions for layers 20, 22 and 26 are discussed below. Polymer layer 38 may be any heat resistant film, such as polycarbonate or polyester, including metallization or coating, such as with $SiO_2$, polyethylene terephthalate (PET) or polybutylene terephthalate (PBT).

Figure 3:
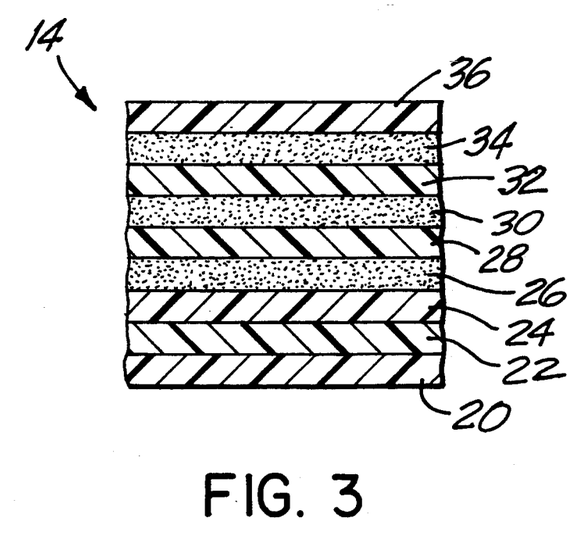
FIG. 3 shows a nine layer structure that is the subject of the present invention.

In FIG. 3, multi-layer film 14 comprises outer sealant layer 20, adjacent sealant layer 22, impact layer 24, adhesive layer 26, tear resistant layer 28, adhesive layer 30, barrier layer 32, adhesive layer 34, and heat sealant layer 36.

Figure 4:
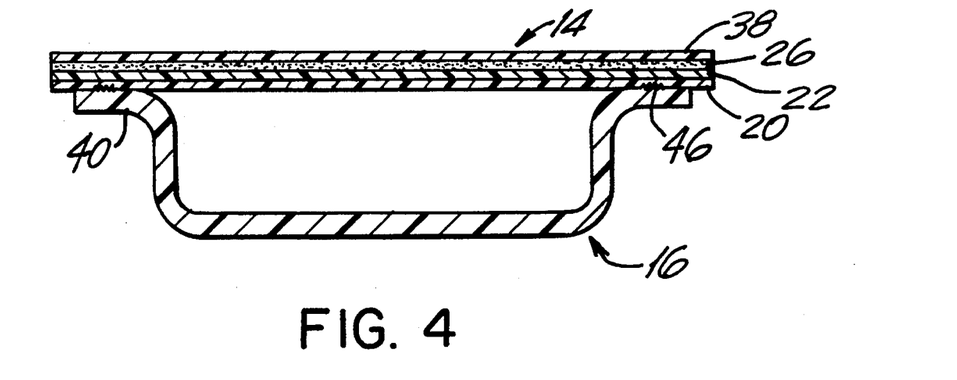
FIGS. 4, 5 an 6 show a package of the present invention as it is being opened and the delamination effect of the multi-layer structures of the present invention.

Outer sealant layer 20 is sealed to the container at sealing interface 46 as shown in FIG. 4. Adjacent sealant layer 22 adheres sufficiently well to outer sealant layer 20 to maintain the multi-layer film 14 together when film 14 is removed from container 16 except adjacent sealing interface 46. The adhesion between layers 20 and 22 is of such a degree that the layers can delaminate when forces are exerted on them pulling them apart.

Layer 24 is an impact modifying layer which reduces film breakage during the package handling and processing.

Layer 26 is an adhesive layer which adheres impact layer 24 to tear resistant layer 28, while adhesive layer 30 adheres tear resistant layer 28 to barrier layer 32. An adhesive layer 34 adheres barrier layer 32 to heat resistant layer 36 which is suitable for reverse printing.

FIG. 4 shows a package comprising container 16 and the multi-layer structures of FIG. 1, as an example of the present invention. The multi-layer laminate 14 is preferably sealed about the peripheral flange 40 of the container 16 by heat sealing. The composition of the container 16 and the outer sealant layer 20 are preferably substantially similar to one another so that the heat sealing creates a sealing interface 46 between the two layers so that those two layers function as a single layer in the area of the seal.

Container or tray 16 may be made of any suitable material, such as an injection molded polyethylene (PE), polypropylene (PP), or a thermoformed laminate which comprises barrier layer, adhesives and an outer polymer layer.

Figure 5:
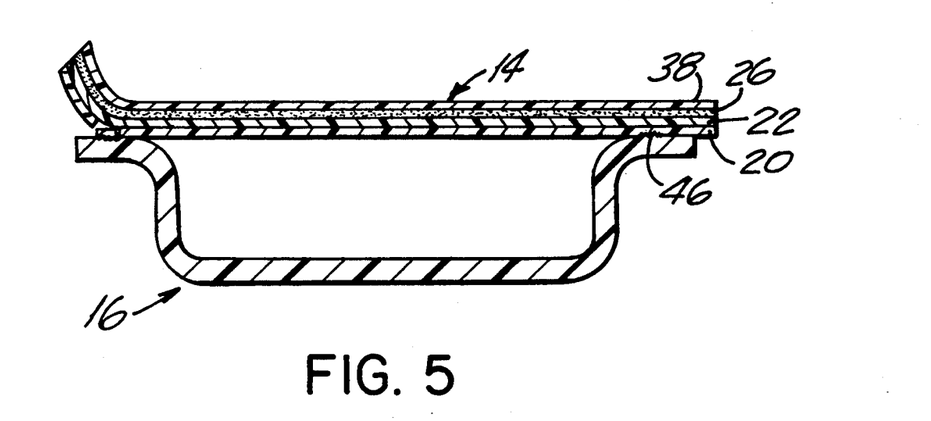

FIG. 5 shows the initial effects of a user exerting upwards pressure on the end of the multi-layer film 14. As an upwards force is directed towards the end of the multi-layer film 14, the outer sealant layer 20 remains adhered to the container 16 and the adjacent sealant layer 22 delaminates from the outer sealant layer 20 adjacent the sealing interface 48.

FIG. 6 shows the final result of the laminate 14 being peeled from the container 16. The film 14 remains intact except for an annular ring 42 of the outer sealant layer 20 which remains deposited on the container 16. The force exerted to pull the end of the film 14 away from the container causes the package to open. Because the strength of the seal between the outer sealant layer 20 and container 16 is greater than the adhesion strength between the outer sealant layer 20 and the adjacent sealant layer 22, the film 14 pulls away from the outer sealant layer 20 adjacent the sealing interface 48.

The outer sealant layer 20 in the illustrated embodiments of the present invention can be from any suitable material which adheres well to the container 16. However, where the film 14 is to be used in a food package intended for retort applications, FDA regulations presently limit the outer sealant layer to polyolefins and certain percentages of other compositions, such as a maximum of 38% polyisobutylene (PIB).

In the preferred embodiment, the container is polypropylene based and is preferably comprised of a blend of 60% polypropylene (PP) and 40% polyethylene (PE).

The outer sealant layer 20 of the preferred embodiment may be of any composition compatible with the PP container of the preferred embodiment. This outer sealant layer may comprise PP, propylene-ethylene copolymer (PPE), low molecular weight α-olefins, such as in copolymers with ethylene (e.g., Tafmer), Ethylene-butene-1 (EB-1), and polyisobutylene (PIB). It is desirable that the total composition of outer sealant layer 20 be predominately PP, that is, greater than 50% PP. This will insure that it adheres sufficiently to a polypropylene based tray or film that is used to form the package.

The outer sealant layer 20 of the preferred embodiment may comprise a blend of 0–38% of a polymer having elastomeric properties, such as polyisobutylene (PIB), or plasticizers, such as copolymers of ethylene and α-olefins, for example, butene and hexene; and greater than 50% up to 100% propylene moieties, as may be selected from the group of propylene homopolymers and propylene copolymers. Examples of other polymers having elastomeric properties are polybutylene, rubber modified styrene, or butadiene styrene copolymers.

A normal range for the outer sealant layer 20 is 10–38% PIB; greater than 50–85% propylene moieties from polypropylene or propylene copolymers, and 0–20% copolymers of ethylene and α-olefins. Preferred ranges for the composition of outer sealant layer 20 are 15–35% PIB; 60–80% propylene moieties, whether from PP, PPE or other compositions; and 0–15% copolymers of α-olefins and ethylene. One such α-olefin/ethylene copolymer is Tafmer A 4085 manufactured by Mitsui. It has been found that the compositions of the outer sealant layer 20 which comprise at least 15% PIB obtain the cleanest peel of the multi-layer film.

Adjacent sealant layer 22 may be of any composition which adheres only to a limited extent to the outer sealant layer 20. For example, if outer sealant layer 20 is predominately propylene based, then the adjacent sealant layer 22 should be predominately of a composition which is not compatible with polypropylene, such as ethylene moieties. Layer 22 may comprise a majority of high density polyethylene (HDPE), linear low density polyethylene (LLDPE), medium density polyethylene (MDPE), low density polyethylene (LDPE), ultra-low density polyethylene (ULDPE) and very low density polyethylene (VLDPE), in addition to a minority component composition which is compatible with the outer sealant layer 20. In the preferred embodiment the adjacent sealant layer 22 may include a minority amount of polypropylene (PP), propylene-ethylene copolymer (PPE), ethylene vinyl acetate (EVA), ethylene normal butyl acrylate (ENBA), ethylene methyl acrylic acid (EMAA), ethylene methyl acrylate (EMA), or other polymers which are compatible with or adhere to the outer sealant layer 20.

The adjacent sealant layer 22 may comprise a blend of greater than 50–90% polyethylene and less than 50–10% of PP, PPE, EVA, ENBA, EMAA or EMA.

A normal range for the adjacent sealant layer 22 is 60–85% polyethylene and 40–15% PP or PPE copolymer, with a preferred range of 60–80% polyethylene and 20–40% propylene moieties. These blends have sufficient affinity for the PP based outer sealant layer 20 to hold the film together, yet delaminate under exertion of average manual force opening the package.

Impact layer 24 of the illustrated embodiments preferably comprises a blend of an elastomer and HDPE (RMHDPE). One suitable elastomer approved by the FDA for retort applications is PIB. Other elastomers are polybutylene, rubber modified styrene or butadiene styrene copolymers.

Layers 20, 22 and 24 may be coextruded and then laminated to additional layers as desired.

In embodiments shown in FIG. 3, the coextrusion of layers 20, 22 and 24 is adhesive laminated to the tear resistant layer 28 of a multi-layer film structure comprising tear resistant layer 28, adhesive layer 30, barrier layer 32, adhesive layer 34, and heat resistant layer 36, which may be manufactured by coextrusion and/or lamination processes.

The tear resistant layer 28 may be comprised of polyester; oriented polyester; nylons, which optionally may be biaxially oriented, such as nylon 6; oriented polypropylene or any other suitable tear resistant layer.

Barrier layer 32 may be a vinylidene chloride copolymer, such as with methyl acrylate, foil, metallized polyester, coated polyester, EVOH, or any other desirable barrier layer. It is only necessary that barrier layer 32 be capable of being adhered, by adhesives or otherwise, to layers 28 and 36. Layer 28 must also be capable of adhering to impact layer 24, which in turn must adhere well to adjacent sealant layer 22.

Heat resistant layer 36 may be comprised of polyester, such as PET, PBT, or oriented polyester, polycarbonate or biaxially oriented nylon.

It should be understood that this invention may comprise outer sealant layer 20 and adjacent sealant layer 22 in any compositions as discussed herein, plus any additional layers, which can be from almost any materials conventionally used in the art, such as polyethylene, medium density polyethylene, high density polyethylene, low density polyethylene, linear low density polyethylene, very low density polyethylene, polypropylene, ultra low density polyethylene, ethylene vinyl alcohol, ethylene butene copolymers, polyesters such as polyethylene terephthalate or polybutylene terephthalate, ethylene vinyl acetate, propylene ethylene copolymers, MXD6, nylon, high impact polystyrene, metal foil, vinylidene chloride copolymers, inks, primers or ionomers.

In multi-layer films as described herein, a tie or an adhesive layer may also be present between the layers. Laminates using this invention may include any suitable tie layers or adhesives known in the art and may include polyurethane curing adhesives, anhydride modified polyolefins, such as graft copolymer of maleic anhydride and ethylene, ethylene acrylic acid copolymers, ethylene methyl acrylate copolymers, PP and EVA blends or copolymers or other synthetic adhesive resins. If the package is to be subject to retort applications, the selected adhesive should be stable under those retort conditions.

The multi-layer films, laminates and structures discussed in this application are of the same thickness as conventional multi-layer films, structures and laminates. For example, the total thickness of the laminates of the multi-layer laminates of this invention may range from about 2.5 mils to 10.0 mils, with a normal range of 3 mils to 7 mils, and are preferably about 4 to about 6 mils (0.1–0.15 mm). The outer sealant layer 20 may be of a thickness of 0.2 mils to about 1.00 mils (0.005–0.025 mm) with a preferable range of 0.3 mils to about 0.5 mils. The adjacent sealant layer 22 may be of a thickness of 0.2 mils to about 3.0 mils (0.0051–0.076 mm) with a preferable range of 0.5 mils to about 1.0 mils.

Films of the present invention can be formed by any of the conventional processes for making multi-layer films, including laminations, extrusions, coextrusions, blown extrusion, cast extrusion, tubular water quenched extrusion, extrusion coatings, and the like, and combinations thereof. Coextrusion is presently preferred for forming a multi-layer film, with lamination being used to add additional layers as desired.

The multi-layer film of the present invention is particularly applicable being sealed to a container, such as, for example, a thermoformed tray, by any means known in the art. Appropriate sealing means are heat sealing by either conduction, induction (RF) sealing, impulse resistance wire, ultrasonic, IR or other known heat sealing apparatus.

As an alternative, the film of the present invention can be sealed to another film to form a pouch by forming heat seals or adhesive seals around the periphery of the two films. The second film may comprise layers that are not the present invention since it is only necessary that one side of the film delaminate upon opening the package. It is not necessary that the second sheet delaminate.

One example of such a pouch application is to heat seal the film of the present invention to a multi-layer forming web which comprises layers of PET/adhesive/MA saran/adhesive/PP. The PP layer may comprise a 3 mil thick layer of 100% PP which is heat sealed to the outer sealant layer described herein.

Because one of the goals of this invention is to achieve a peelable multi-layer film which can be peeled with a moderate amount of force, the compositions of the outer sealant layer 20 and adjacent sealant layer 22 are interdependent. For example, if $\alpha$-olefin ethylene copolymer is used a maximum of 11% in the outer sealant layer 20, then the adjacent sealant layer 22 should preferably include no more than 85% PE because $\alpha$-olefin ethylene copolymer and PE have an affinity for one another. If no $\alpha$-olefin ethylene-1 is included in the outer sealant layer 20, the polyethylene content of adjacent sealant layer 22 should preferably be greater than 50–80% to control adhesion between layers 20 and 22 and thus control peel strength within a desirable range.

An acceptable range of seal strength for cold peel is 2.0 to 10.0 pounds per inch, with a normal range peel strength of 3.0 to 7.0 pounds per inch, and a preferred range of 4.0 to 6.0 pounds per inch.

The prior art structures comprising a film and a thermoformed tray or base film generally required greater than 10 pounds per inch in a cold peel to remove the film structures from the container or base film. The seal strength of the prior art film structures to the container, for example, was greater than the tensile strength of the film structure resulting in the film structure failing by tearing or delaminating (i.e., not at a predetermined interface).

The following non-limiting examples are given by way of illustration and are not intended to be considered a limitation of this invention.

EXAMPLES

The following multi-layer structures were prepared by coextruding the outer sealant layer, adjacent sealant layer and impact layer. As discussed below, some of these coextrusions were laminated to additional film layers.

In the following examples:
A. J-60-110-157 and J60-100-130 are HDPEs manufactured by Soltex. These may be abbreviated by J-60-100 or J-60-110.
B. 3201 is rubber modified HDPE or a PIB-HDPE blend sold by Paxon.
C. SD-753 and SD-752 are PPE copolymers, each of which include approximately 3% ethylene content.
D. P-20192C is a blend of PP and titanium oxide ($TiO_2$).
E. A-4085 is a copolymer of $\alpha$-olefin and ethylene, known as Tafmer, which is manufactured by Mitsui.
F. PA-30 is a PP-PIB Blend sold by Exxon.

EXAMPLES 1–4

| EXAMPLE | IMPACT LAYER | ADJACENT SEALANT LAYER | OUTER SEALANT LAYER |
|---|---|---|---|
| 1 | 50% J60-100-130<br>50% Paxon 3201<br>(.94 mils) | 16% P20192C<br>62% J60-100-130<br>22% SD-752<br>(.76 mils) | SD-752<br>(.3 mils) |
| 2 | 50% J60-100-130<br>50% Paxon 3201<br>(.94 mils) | 16% P20192C<br>72% J60-100-130<br>12% SD-752<br>(.76 mils) | SD-752<br>(.3 mils) |
| 3 | 50% J60-100-130<br>50% Paxon 3201<br>(.94 mils) | 16% P20192C<br>82% J60-100-130<br>2% SD752<br>(.76 mils) | SD-752<br>(.3 mils) |
| 4 | 50% J60-100-130<br>50% Paxon 3201<br>(.70 mils) | 16% P20192C<br>50% J60-100-130<br>12% 3201<br>22% SD752<br>(1.0 mils) | SD-752<br>(.3 mils) |

Each of the sealant coextrusions in Examples 1-4 above was adhesive laminated to an additional structure of PET/adhesive/saran/adhesive/PET to create a film with a total thickness of 5.2 mils. The lidstocks were heat sealed to trays at 330° F. and 50 psi with the inner layer in contact with the tray. All samples peeled with reasonable force, although there was some stringing between the laminate and tray as the multi-layer laminates did not peel cleanly. Examples 1 and 2 provided the smoothest peel and the most intact seal, with Example 2 being the better of the two.

EXAMPLES 5-14

| EX-AM-PLE | IMPACT LAYER | ADJACENT SEALANT LAYER | OUTER SEALANT LAYER | SEAL STRENGTH (LBS/IN) |
|---|---|---|---|---|
| 5 | 50% 3201<br>50% J-60-110<br>(.7 mils) | 72% J-60-100<br>16% P20192C<br>12% SD-753<br>(1.0 mils) | 51% PA-30<br>38% SD-753<br>11% A-4085<br>(.3 mils) | 5.9 |
| 6 | 50% 3201<br>50% J-60-110<br>(.7 mils) | 62% J-60-100<br>16% P20192C<br>22% SD-753<br>(1.0 mils) | 51% PA-30<br>49% SD-753<br>(.3 mils) | 5.2 |
| 7 | 50% 3201<br>50% J-60-110<br>(.7 mils) | 62% J-60-100<br>16% P20192C<br>22% SD-753<br>(1.0 mils) | 51% PA-30<br>49% SD-753<br>(.3 mils) | 4.8 |
| 8 | 50% 3201<br>50% J-60-110<br>(.7 mils) | 82% J-60-100<br>16% P-20192C<br>2% SD-753<br>(1.0 mils) | 51% PA-30<br>38% AD-753<br>11% A-4085<br>(.3 mils) | 6.9 |
| 9 | 50% 3201<br>50% J-60-110<br>(.7 mils) | 72% J-60-100<br>16% P20192C<br>12% SD-753<br>(1.0 mils) | 51% PA-30<br>38% SD-7536<br>11% A-4085<br>(.3 mils) | 6.7 |
| 10 | 50% 3201<br>50% J-60-110<br>(.7 mils) | 65% J-60-100<br>35% SD-753<br>(1.0 mils) | 51% PA-30<br>38% AD-753<br>11% A-4085<br>(.3 mils) | 6.2 |
| 11 | 50% 3201<br>50% J-60-110<br>(.7 mils) | 72%<br>J-60-100*<br>16% P20192C<br>12% SD-753<br>(1.0 mils) | 51% PA-30<br>38% SD-753<br>11% A-4085<br>(.3 mils) | 8.1 |
| 12 | 50% 3201<br>50% J-60-110<br>(.7 mils) | 72% J-60-100<br>16% P20192C<br>12% SD-753<br>(1.0 mils) | 51% PA-30<br>38% SD-753<br>11% A-4085<br>(.3 mils) | 6.4 |
| 13 | 50% J-60-110<br>50% 3201<br>(.7 mils) | 72% J-60-110<br>16% P20192C<br>12% SD-753<br>(.8 mils) | 51% PA-30<br>38% SD-753<br>11% A-4085<br>(.5 mil) | 6.5 |
| 14 | 50% J-60-110<br>50% 3201<br>(.7 mils) | 72%<br>J-60-110*<br>16% P20192C<br>12% SD-753<br>(1.0 mils) | 51% PA-30<br>38% SD-753<br>11% A-4085<br>(.3 mils) | 7.0 |

Each of the sealant coextrusions in Examples 5-14 above was adhesive laminated to an additional structure of PET/adhesive/saran/adhesive/PET to create a film with a total thickness of 5.2 mils. The multi-layer film was heat sealed to a PP sheet at 400° F. for two seconds with 50 psi. A number of samples were peeled and the resulting average seal strength recorded as indicated in the table above. The Examples above state the desired ranges of the compositions. However, infrared spectrometer tests indicated that the percentage of PE (i.e., J-60-100) was higher than the desired 72% in Examples 11 and 14 (marked by asterisks), resulting in a somewhat higher peel strength for those Examples.

EXAMPLES 15-21

| EX-AM-PLE | 1ST INTER-MEDIATE LAYER | 2ND INNER LAYER | 1ST INNER LAYER | SEAL STRENGTH (LBS/IN) |
|---|---|---|---|---|
| 15 | 50% 3201<br>50% J-60-110<br>(.7 mils) | 72% J-60-100<br>16% P20192C<br>12% SD-753<br>(1.0 mils) | 51% PA-30<br>38% SD-753<br>11% A-4085<br>(.3 mils) | 10.9 |
| 16 | 50% 3201<br>50% J-60-110<br>(.7 mils) | 72% J-60-100<br>16% P20192C<br>12% SD-753<br>(1.0 mils) | 51% PA-30<br>38% SD-753<br>11% A-4085<br>(.3 mils) | 13.1 |
| 17 | 50% J-60-110<br>50% 3201<br>(.7 mils) | 72% J-60-110<br>16% P20192C<br>12% SD-753<br>(1.0 mils) | 51% PA-30<br>38% SD-753<br>11% A-4085<br>(.5 mils) | 12.2 |
| 18 | 50% J-60-110<br>50% 3201<br>(.7 mils) | 72% J-60-110<br>16% P20192<br>12% SD-753<br>(1.0 mils) | 51% PA-30<br>38% SD-753<br>11% A-4085<br>(.3 mils) | 11.5 |
| 19 | 50% J-60-110<br>50% 3201<br>(.7 mils) | 72% J-60-110<br>16% P-73764<br>12% SD-753<br>(1.0 mils) | 51% PA-30<br>38% SD-753<br>11% A-4085<br>(.3 mil) | 11.3 |
| 20 | 50% J-60-110<br>50% 3201<br>(.7 mils) | 72% J-60-110<br>16% 5132 PP<br>12% SD-753<br>(1.0 mils) | 51% PA-30<br>38% SD-753<br>11% A-4085<br>(.3 mil) | 11.7 |
| 21 | 50% J-60-110<br>50% 3201<br>(.7 mils) | 65% J-60-110<br>23% 5132<br>12% SD-753<br>(1.0 mils) | 51% PA-30<br>38% SD-753<br>11% A-4085<br>(.3 mil) | 10.1 |

The multi-layer coextrusion of Examples 15-21 were heat sealed at 400° F. and 50 psi for two seconds between test structures of PET/foil/LDPE and PP sheet, as opposed to a thermoformed tray. A number of samples were tested. It was found that the samples opened cleanly from the PP sheet under the forces as noted above. While many of the three layer sealant coextrusions of Examples 15-21 are similar to or the same as the coextrusions of Examples 5-14, Examples 15-21 had different seal strengths than the similar sealants which were laminated to the trays in Examples 5-14.

It was found that a three layer coextrusion which had a seal strength of 10-12 pounds per inch when sealed to the test structures of Examples 15-21 would have a seal strength of approximately 5-7 pounds per inch when adhesive laminated to the trays discussed above regarding FIG. 3. This is believed to be due to the difference in the geometric shape of the tray and the sheet. The presence of foil in the multi-layer coextrusion may also conduct heat faster and create a different seal. The film of examples 15-21 should be easier to peel than prior art film sealed to the same structure.

EXAMPLES 22-25

| EX-AM-PLE | IMPACT LAYER | ADJACENT SEALANT LAYER | OUTER SEALANT LAYER | POST RETORT SEAL STRENGTH (LBS/¼ IN) COLD | HOT |
|---|---|---|---|---|---|
| 22 | 50% 3201<br>50% J-60-110<br>(.7 mil) | 72% J-60-100<br>16% P20192C<br>12% SD-753<br>(1.0 mil) | 51% PA-30<br>38% SD-753<br>11% A-4085<br>(.3 mil) | 3.0 | 2.4 |
| 23 | 50% 3201<br>50% J-60-110<br>(.7 mil) | 72% J-60-100<br>16% P20192C<br>12% SD-753 | 51% PA-30<br>38% SD-753<br>11% A-4085 | 3.4 | 2.6 |

-continued

| EXAMPLE | IMPACT LAYER | ADJACENT SEALANT LAYER | OUTER SEALANT LAYER | POST RETORT SEAL STRENGTH (LBS/¼ IN) COLD | HOT |
|---|---|---|---|---|---|
| 24 | 50% J-60-110 50% 3201 (0.7 mil) | 72% J-60-110 16% P20192C 12% SD-753 (1.0 mil) | 51% PA-30 38% SD-753 11% A-4085 (.5 mil) | 2.7 | 2.0 |
| 25 | 50% J-60-110 50% 3201 (.7 mil) | 72% J-60-110 16% P20192C 12% SD-753 (1.0 mil) | 51% PA-30 38% SD-753 11% A-4085 (.3 mil) | 2.8 | 2.1 |

The above three layer sealant coextrusions were adhesive laminated to a structure of PET/adhesive/saran-/adhesive/PET. The resulting laminate was heat sealed to 60% PP/40% PE stock which is used to make thermoformed trays. The seal was a one quarter inch seal created at 400° F. and 50 psi for three seconds. All of the laminates peeled very easily within an acceptable force range. Some partial delamination of the multi-layer laminate occurred with Example 25. However, the delamination occurred as a result of a defect in the adhesive layer and does not reflect on the delamination mechanism. While Examples 22 through 25 used the same multi-layer structures as used in earlier examples, the seals are one-quarter inch in Examples 22–25 and one inch in the other Examples. Even though the seal strength of the one inch seal was greater than the one-quarter inch seal, it is expected that these seals are better than one inch seals using prior art structures.

EXAMPLES 26–37

| EXAMPLE | IMPACT LAYER | ADJACENT SEALANT LAYER | OUTER SEALANT LAYER | POST RETORT SEAL STRENGTH (LBS/IN) COLD | HOT |
|---|---|---|---|---|---|
| 26 | 50% 3201 50% J-60-100 (.7 mil) | 72% J-60-100 16% P20192C 12% SD-753 (1.0 mil) | 51% PA-30 38% SD-753 11% A-4085 (.3 mil) | 7.8 | 5.7 |
| 27 | 50% 3201 50% J-60-100 (.7 mil) | 72% J-60-100* 16% P20192C 12% SD-753 (1.0 mil) | 51% PA-30 38% SD-753 11% A-4085 (.3 mil) | 9.7 | 6.0 |
| 28 | 50% J-60-110 50S 3201 (0.7 mil) | 72% J-60-110 16% P20192C 12% SD-753 (0.8 mil) | 51% PA-030 38% SD-753 11% A-4085 (.5 mil) | 6.9 | 4.6 |
| 29 | 50% J-60-110 50% 3201 (.7 mil) | 72% J-60-110 16% P20192C 12% SD-753 (1.0 mil) | 51% PA-30 38% SD-753 11% A-4085 (.3 mil) | 7.0 | 4.5 |
| 30 | 50% J60-100-130 50% Paxon 3201 (.7 mils) | 72% J60-100-130 16% Chroma P20192C 12% SD-753 (1.0 mils) | 51% PA-30 38% SD-753 11% A-4085 (.3 mils) | 7.1 | 4.1 |
| 31 | 50% J60-100-130 50% Paxon 3201 (.7 mils) | 62% J60-100-130 16% Chroma P20192C 22% SD-753 (1.0 mils) | 51% PA-30 49% SD-753 (.3 mils) | 6.1 | 3.8 |
| 32 | 50% J60-100-130 50% Paxon 3201 (.7 mils) | 62% J60-100-130 16% Chroma P20192C 22% SD-753 (1.0 mils) | 51% PA-30 49% SD-753 (.3 mils) | 4.7 | 3.3 |
| 33 | 50% 3201 50% J-60-110 (.7 mils) | 82% J-60-100 16% P-20192C 2% SD-753 (1.0 mils) | 51% PA-30 38% AD-753 11% A-4085 (.3 mils) | 8.1 | 5.1 |
| 34 | 50% 3201 50% J-60-100 (.7 mil) | 72% J-60-100 16% P20192C 12% SD-753 (1.0 mil) | 51% PA-30 38% SD-753 11% A-4085 (.3 mil) | 7.5 | 4.3 |
| 35 | E-16370-91 A2 50% 3201 50% J-60-110 (.7 mils) | 65% J-60-100 35% SD-753 (1.0 mils) | 51% PA-30 38% AD-753 11% A-4085 (.3 mils) | 7.2 | 5.1 |

The three layer sealant coextrusions of Examples 26–35 were adhesive laminated to a multi-layer laminate of PET/adhesive/saran/adhesive/PET. The resulting laminate was heat sealed to a propylene based sheet by a one inch seal created at 400° F. and 50 psi for two seconds. The seals were subject to retort conditions and the samples opened when the packages were both cold and hot. All of the laminates exhibited a seal strength within the acceptable ranges for both hot and cold seals. All of the examples delaminated at the preferred interface except for one of the hot samples of Example 27, which resulted from an adhesive failure. As before, the asterisk (*) at J-60-100 of Example 27 indicates IR spectroscopy showed that the HDPE content was higher than the desired 72%. This resulted in a somewhat higher peel strength for that Example.

However, even that sample performed in an acceptable manner since the seal strength was in an acceptable range and the outer sealant layer 20 did not separate from the tray.

EXAMPLES 36–37

| EXAMPLE | IMPACT LAYER | ADJACENT SEALANT LAYER | OUTER SEALANT LAYER | POST RETORT SEAL STRENGTH (LBS/IN) COLD | HOT |
|---|---|---|---|---|---|
| 36 E-16399-91 3B | 50% J60-100-130 50% Paxon 3201 (.7 mils) | 72% Paxon 3201 16% Chroma P20192C 12% SD-753 (1.0 mils) | 80% SD-753 20% A-4085 (.3 mils) | DID NOT PEEL AS WELL AS OTHER LAMINATES. SOME STRINGING AND PARTIAL DELAMINATION | |

-continued

| EXAMPLE | IMPACT LAYER | ADJACENT SEALANT LAYER | OUTER SEALANT LAYER | POST RETORT SEAL STRENGTH (LBS/IN) | |
|---|---|---|---|---|---|
| | | | | COLD | HOT |
| 37 E-16399-91 4B | 50% J60-100-130 50% Paxon 3201 (.7 mils) | 62% J60-100-130 16% Chroma P20192C 22% SD-753 (1.0 mils) | 80% SD-753 20% A-4085 (.3 mils) | | |

The three layer coextrusions of Examples 36 and 37 were adhesive laminated with adhesive to a laminate structure of PET/adhesive/saran/adhesive/PET. Examples 36–37, which lack polyisobutylene, did not peel as cleanly as the other Examples, demonstrating a preference for PIB in the outer sealant layer of these preferred examples.

The three layer coextrusions in the above Examples were laminated to multi-layer laminates which comprised the following: (1) a polyurethane curing adhesive, such as Morton 76T198, with a 9LT catalyst, and an optional white dye; (2) a 48 gauge PET layer manufactured by LBT; and (3) a barrier film, of 100 gauge MA saran, examples of which are Asahi Barrilon UB film and/or Dow HB-200.

Of the above multi-layer films that were sealed to a tray or another film and tested for seal strength, all films of the Examples delaminated sufficiently to open the packages made with those films. Examples 5 through 30 performed better in that the multi-layer films peeled cleanly off of the tray or other film. Example 34 performed best in terms of having the preferred optimum peeling force.

The multi-layer films of this invention that were tested as shown in the above Examples by being made in packages and subjected to retort, generally withstood the severe conditions of retorting. The subject invention films also exhibited a greater range of acceptable heat sealing conditions than prior art films.

All of the Examples described herein relate to a PP based tray or base film and a film structure having a propylene based outer sealant layer and an ethylene based adjacent sealant layer. However, this invention is expected to have equal application for a film structure to be sealed to a polyethylene based container or base film.

The preferred film structure for sealing to a PE based container or base film would have an outer sealant layer 20 and an adjacent sealant layer 22 with compositions opposite those discussed in the above embodiments. That is, the outer sealant layer would be ethylene based and comprise the polyethylene based composition that is discussed above for the adjacent sealant layer. The adjacent sealant layer of a film to be sealed to a PE based container or base film would comprise the compositions discussed above for the outer sealant layer. The film structure has a controlled peel because of the relative affinity of the two layers (the outer sealant layer and the adjacent sealant layer) for each other. That affinity and the resulting delamination mechanism will remain constant if the compositions of the two layers discussed in the above Examples are switched to make a film appropriate for sealing to a PE based container or base film.

It is understood that the invention defined by the appended claims is not to be limited by particular details set forth in the above description, as a person skilled in the art will be aware of many variations that are possible without departing from the spirit or scope of the present invention.

We claim:

1. A multi-layer film structure comprising a first layer, a second layer and a third layer, each of said layers being separate distinct and different layers where the second layer is in face-to-face contact with the first layer, the third layer is in face-to-face contact with the second layer,
   wherein the first layer is comprised of greater than 50% of propylene polymers, the second layer comprises greater than 50% HDPE and from 2–35% PPE copolymers, and the third layer comprises HDPE, a rubber modified HDPE or a PIB-HDPE blend, and the first and second layers can be peel separated from each other.

2. The film of claim 1, wherein the first layer comprises more than 50% of a member selected from
   a PPE copolymer,
   a blend of a PPE copolymer, PP and PIB, or
   a blend of a PPE copolymer, PP and PIB, and a copolymer of an α-olefin and ethylene.

3. The film of claim 2, wherein the first layer comprises at least one of polypropylene or propylene-ethylene copolymers.

4. The film of claim 2 wherein the first layer additionally comprises polyisobutylene in a positive amount up to 38%.

5. The film of claim 1, wherein the first layer comprises from greater than 50% to 85% propylene polymers.

6. The film of claim 5, wherein the second layer comprises from greater than 50% to 90% HDPE.

7. The film of claim 6, wherein the second layer additionally comprises at least one of polypropylene, ethylene vinyl acetate copolymer, ethylene methyl acrylic acid copolymer, ethylene methyl acrylate copolymer or ethylene normal butyl acrylate copolymer.

8. The film of claim 1 wherein the film delaminates when cold under a force of 3.0 to 7.0 pounds per inch of seal being exerted to separate the layers of the film.

9. The film of claim 1 wherein the film can withstand 212° F. to 275° F. for 20 to 90 minutes without delamination absent forces being exerted on the film to separate the layers of the film.

10. A package made from a film comprising the film structure of claim 1.

11. A package made from a film comprising the film structure of claim 6.

12. A member of the group consisting of films of claim 2 wherein
   a) the first layer contains about 100% PPE copolymers, the second layer contains about 16% of a blend of PP and TiO$_2$, about 62% HDPE, and about 22% PPE copolymer, and the third layer contains about 50% HDPE and about 50% rubber modified HDPE or a blend of PIB and HDPE;

b) the first layer contains about 100% PPE copolymers, the second layer contains about 16% of a blend of PP and $TiO_2$, about 72% HDPE, and about 12% PPE copolymer, and the third layer contains about 50% HDPE and about 50% rubber modified HDPE or a blend of PIB and HDPE;

c) the first layer contains about 100% PPE copolymers, the second layer contains about 16% of a blend of PP and $TiO_2$, about 82% HDPE, and about 2% PPE copolymer, and the third layer contains about 50% HDPE and about 50% rubber modified HDPE or a blend of PIB and HDPE;

d) the first layer contains about 100% PPE copolymers, the second layer contains about 16% of a blend of PP and $TiO_2$, about 50% HDPE, about 12% rubber modified HDPE or a blend of PIB and HDPE, and about 22% PPE copolymer, and the third layer contains about 50% HDPE and about 50% rubber modified HDPE or a blend of PIB and HDPE;

e) the first layer contains about 51% of a PP and PIB blend, about 38% PPE copolymer and about 11% of an α-olefin ethylene copolymer, the second layer contains about 72% HDPE, about 16% of a blend of PP and $TiO_2$, and about 12% PPE, and the third layer contains 50% rubber modified HDPE or a blend of PIB and HDPE, and 50% HDPE;

f) the first layer contains about 51% of a PP and PIB blend, and about 49% PPE copolymer, the second layer contains about 62% HDPE, about 16% of a blend of PP and $TiO_2$, and about 22% PPE, and the third layer contains 50% rubber modified HDPE or a blend of PIB and HDPE, and 50% HDPE;

g) the first layer contains about 51% of a PP and PIB blend, about 38% PPE copolymer and about 11% of an α-olefin ethylene copolymer, the second layer contains about 82% HDPE, about 16% of a blend of PP and $TiO_2$, and about 2% PPE, and the third layer contains 50% rubber modified HDPE or a blend of PIB and HDPE, and 50% HDPE;

h) the first layer contains about 51% of a PP and PIB blend, about 38% PPE copolymer and about 11% of an α-olefin ethylene copolymer, the second layer contains about 72% HDPE, about 16% of a blend of PP and $TiO_2$, and about 12% PPE, and the third layer contains 50% rubber modified HDPE or a blend of PIB and HDPE, and 50% HDPE;

i) the first layer contains about 51% of a PP and PIB blend, about 38% PPE copolymer and about 11% of an α-olefin ethylene copolymer, the second layer contains about 65% HDPE, and about 35% PPE, and the third layer contains 50% rubber modified HDPE or a blend of PIB and HDPE, and 50% HDPE;

j) the first layer contains about 51% of a PP and PIB blend, about 38% PPE copolymer and about 11% of an α-olefin ethylene copolymer, the second layer contains about 65% HDPE, about 23% polypropylene homopolymer and about 12% PPE, and the third layer contains 50% rubber modified HDPE or a blend of PIB and HDPE, and 50% HDPE;

k) the first layer contains about 80% of a PPE copolymer and about 20% of an α-olefin ethylene copolymer, the second layer contains about 72% rubber modified HDPE or a blend of HDPE and PIB, about 16% of a blend of PP and $TiO_2$, and 12% PPE copolymer, and the third layer contains 50% rubber modified HDPE or a blend of PIB and HDPE, and 50% HDPE;

l) the first layer contains about 80% of a PPE copolymer and about 20% of an α-olefin ethylene copolymer, the second layer contains about 62% rubber modified HDPE or a blend of HDPE and PIB, about 16% of a blend of PP and $TiO_2$, and 22% PPE copolymer, and the third layer contains 50% rubber modified HDPE or a blend of PIB and HDPE, and 50% HDPE.

* * * * *